United States Patent [19]

Strahl et al.

[11] Patent Number: 5,443,284
[45] Date of Patent: Aug. 22, 1995

[54] AIR BAG CUSHION RIVETLESS RETAINER RING, AXIAL PIN METHOD

[75] Inventors: Paul E. Strahl; John E. Allard, both of Ogden; Gary V. Adams, Brigham City, all of Utah

[73] Assignee: Morton International, Inc., Chicago, Ill.

[21] Appl. No.: 48,567

[22] Filed: Apr. 15, 1993

Related U.S. Application Data

[63] Continuation of Ser. No. 778,541, Oct. 17, 1991, abandoned.

[51] Int. Cl.⁶ ............................................. B60R 21/16
[52] U.S. Cl. ................................... 280/728.2; 29/513
[58] Field of Search ........... 280/728 R, 728 A, 730 R, 280/731, 732, 743 R, 736; 220/4.24, 309; 403/282, 279, 276; 29/513; 411/521

[56] References Cited

U.S. PATENT DOCUMENTS

| 384,118 | 6/1888 | Bellinger | 29/513 |
|---|---|---|---|
| 1,992,710 | 2/1935 | Matthaei | 29/513 |
| 2,625,723 | 1/1953 | Bassett | 29/513 |
| 2,920,682 | 1/1960 | Lindberg | 220/4.24 |
| 3,050,160 | 8/1962 | Chesser | 29/513 |
| 3,105,295 | 10/1963 | Calhoun | 29/513 |
| 3,210,815 | 10/1965 | Bruening | 29/513 |
| 3,640,556 | 2/1972 | Bennett | 29/513 |
| 3,810,523 | 5/1974 | Yamaguchi et al. | 280/739 |
| 3,824,757 | 7/1974 | Coop | 29/513 |
| 4,988,119 | 1/1991 | Hartmeyer | 280/743 |
| 5,022,676 | 6/1991 | Rogerson | 280/743 |
| 5,062,664 | 11/1991 | Bishop et al. | 280/732 |
| 5,064,218 | 11/1991 | Hartmeyer | 280/743 |
| 5,141,247 | 8/1992 | Barth | 280/728 A |
| 5,176,400 | 1/1993 | McGuire et al. | 280/728 |
| 5,259,641 | 11/1993 | Schenk et al. | 280/728 A |
| 5,308,107 | 5/1994 | Watanabe | 280/728 A |
| 5,368,327 | 11/1994 | Shiraki | 280/728 A |

FOREIGN PATENT DOCUMENTS 1304069 8/1962 France .................... 220/4.24

Primary Examiner—Karin L. Tyson
Attorney, Agent, or Firm—Mark F. LaMarre; Charles N. Lovell; Gerald K. White

[57] ABSTRACT

A clamping device for clamping an automotive air bag to an automotive air bag inflator. The clamping device includes an annular retainer ring and module housing. Axial descending members, in the form of tabs, pins, or circular posts are attached to the bottom of the annular retainer and pass through holes in the air bag and module housing. The axial descending members provide additional places wherein the shear stress of the air bag fabric can resist the forces applied to the air bag during deployment. Undersized fastener openings in the module housing in conjunction with annular retainer tabs bent to grasp the module housing clamp the air bag during assembly of the air bag module without installation, thus securing the inflator.

7 Claims, 5 Drawing Sheets

AIR BAG CUSHION RIVETLESS RETAINER RING, AXIAL PIN METHOD

This is a continuation of application Ser. No. 07/778,541 filed on Oct. 17, 1991, now abandoned.

BACKGROUND OF THE INVENTION

1. Field of the Invention

This invention relates to an inflatable type occupant restraint system, or as it is commonly known an air bag restraint system. Such a system may be installed in an automobile or other vehicle, at least in part on the steering wheel for the protection of the driver and also on the dashboard for passenger protection in the event of a collision. More particularly, this invention relates to an improvement in the means for holding the air bag in such a device.

1. Description of Related Art

During the manufacture of an air bag restraint system numerous components must be installed and checked to produce the finished air bag module. Among the components of the air bag module are the cover, air bag, air bag holder means (annular retainer, module housing, and fasteners), gas generator or inflator, ignition element, and a means to attach the assembly to the body of the automobile. The inflator due to the presence of the gas generant, a pyrotechnic, is the most sensitive component. For safety reasons it is desirable to delay installation of the inflator to as late as possible in the assembly process.

In a vehicle equipped with an air bag safety system, the air bag is instantly inflated in the event of a collision to protect the occupant from injury. The air bag is inflated by the pressure of a gas supplied from an inflator fixed or mounted to the steering wheel, dashboard or other appropriate part of the body of the automobile.

It has been determined that in order to protect a driver during a collision of an automobile the air bag should be inflated within 20 to 40 milliseconds after the initial impact. The high pressure gas, supplied to the air bag, necessary to inflate the air bag within the short period of time required produces forces which tend to pull and separate the air bag from its mounting. In addition, the impact of the occupant against the inflated air bag tends to increase these forces. To resist these strong forces a mounting device of considerable strength must be provided to insure the safety of the occupant.

In a conventional mounting for an air bag, the peripheral region around the outer circumference of the gas inlet opening into the air bag is clamped between a module housing provided around the gas discharge or exit opening and an annular retainer secured to the module housing. The module housing is mounted to the vehicle body, for example, the steering wheel. The annular retainer is bolted or riveted to the module housing.

In another conventional mounting arrangement the air bag is riveted to the annular retainer. The annular retainer with the air bag affixed thereto is then bolted to the module housing and the inflator. The use of rivets to attach the air bag is a major cause of reworking of the inflator module assembly due to the necessity of replacing broken or unfastened rivets. Reworking of the inflator module is not always possible. In these situations the defective modules must be discarded, resulting in lost production and increased cost of manufacturing. The elimination of rivets in the manufacture of the air bag module assembly would eliminate a major cause for reworking and disposal of defective inflator modules.

In the event of a collision, the large forces produced by the inflation of the bag and the impact of the body of the occupant against the bag tend to pull the clamped portion of the bag from the inflator. The force holding the air bag to the inflator is not evenly distributed over the entire area of the abutment between the annular retainer and the clamped portion of the air bag. Instead, the force of holding the air bag to the inflator is concentrated in the shearing resistance of that part of an air bag which has a width corresponding to the diameter of the fastener and a length corresponding to the distance from the fastener to the edge of the gas inlet opening of the air bag. This clamping action of the retainers may be insufficient to prevent separation of the bag from the retainers. Such separation would permit the escape of gas directly into the passenger compartment of the vehicle endangering the safety of the driver and other occupants of the vehicle.

One solution to provide clamping of the air bag and to increase the shear strength of the air bag between the fastener and the inner edge of gas inlet opening is to dispose a plurality of slotted studs perpendicularly away from the axial face of the retainer ring as disclosed by Hartmeyer, U.S. Pat. No. 4,988,119. The slotted studs have enlarged heads which deflect due to the central slot when passed through an aperture in the air bag and base plate and expand once through the aperture to engage the material surrounding the aperture. Rivets are then disposed through the studs to further engage the base plate.

SUMMARY OF THE INVENTION

An object of this invention is to provide a means of clamping an air bag during assembly of an air bag module (air bag, inflator, mounting bracket, and cosmetic cover) without permanently securing the fastener means.

Another object of this invention is to provide an automotive air bag safety restraint module the component parts of which are so arranged as to allow the installation of the inflator at the final step in the assembly of the air bag module.

Another object of this invention is to eliminate the need for rivets to attach the air bag to the annular retainer.

These and other objectives of the invention, which will become apparent from the following description, have been achieved by a novel clamping device for holding an air bag onto a matching inflator. The air bag is clamped around the periphery of the gas inlet opening of the air bag by a clamping device which includes an annular retainer or retainer ring and a module housing.

The annular retainer or retainer ring has an inner boundary, a body with a top and bottom, an outer boundary, and a plurality of first holes passing through the annular retainer. A plurality of axial descending members are attached to the bottom of the annular retainer. These members are selected from a group consisting of tabs, dimples, and circular posts. Optionally, walls substantially perpendicular to the body of the ring are attached to the top of the annular ring at its inner and outer boundaries. The clamping device also includes a module housing having a mounting edge, body with a top and bottom, and an inner boundary defining a central opening matching the shape of the inflator with a plurality of second and third holes passing through the body of the module housing radially outward of the central opening. The third holes are positioned to receive the axial descending members from the annular retainer when the annular retainer is brought into proper relation to the module housing. Optionally, the second holes can be undersized, that is the diameter of the second holes is less than the diameter of the fastener means passing through the second holes.

The air bag which is to be held to the inflator housing has a gas inlet opening in the central region thereof which conforms to the shape of the inflator, a plurality of fourth holes radially outward of the gas inlet opening to accommodate the fastener means, and a plurality of fifth holes radially outward of the gas inlet opening to accommodate the members of the annular retainer. Fastener means are passed through the first, fourth, and second holes to join the retainer ring, air bag, and module housing respectively.

The clamping device, with the combination of axial clamping, fasteners, and axial descending members holds the air bag onto the inflator during deployment. Further, during assembly of the air bag module the air bag can be held in place by the optional undersized second holes without otherwise securing the fastener means. To further secure the air bag during assembly of the air bag module, tabs are used as the axial descending members. The tabs after passing through the air bag and module housing are deformed or bent so as to engage the underside of the module housing, thus holding the air bag to the module housing without otherwise securing the fastener.

The various features of novelty that characterize the invention are pointed out with particularity in the claims that are annexed to and form a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawings which form part of the specification, in which like parts are designated by the same reference numbers, and of which.

DETAILED DESCRIPTION OF THE PREFERRED EMBODIMENT

Figure 1:
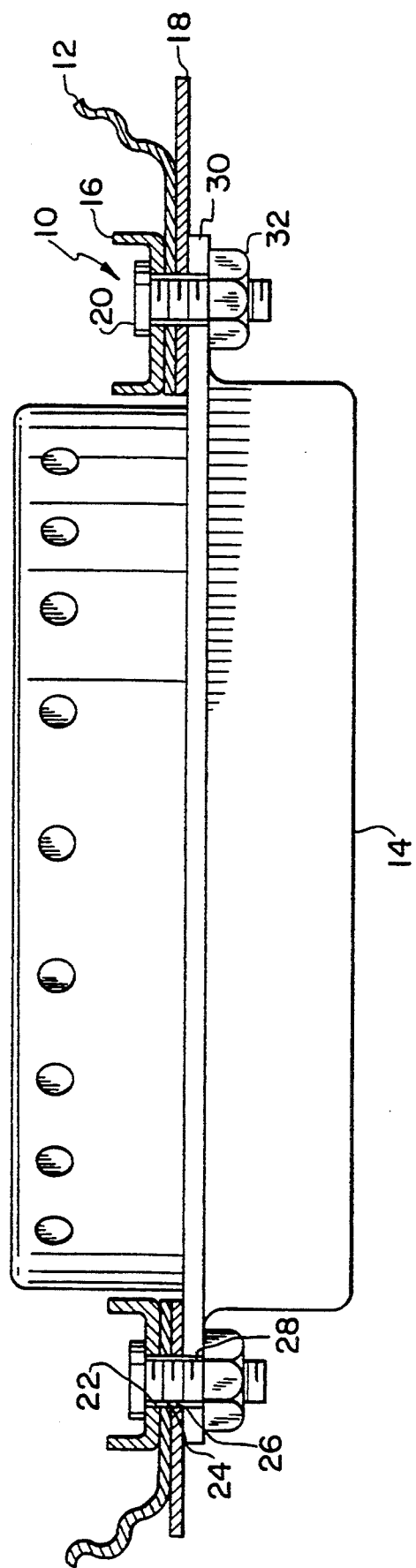
FIG. 1 is a cross-sectional view of the clamping assembly and illustrates the clamping of the air bag by the annular retainer and the module housing and the attachment of the inflator.

As best seen in FIG. 1, a clamping device shown generally at 10 for clamping an air bag 12 to an inflator 14, comprises an annular retainer or retainer ring 16 and a module housing 18. A fastener means 20 passes through an annular retainer fastener opening or hole 22 (hereinafter termed first hole), air bag fastener opening or hole 24, a module housing fastener opening or hole 26 (hereinafter termed second hole), and an opening or hole 28 in a flange 30 provided on inflator 14, terminating with a nut 32 or the like.

Figure 2:
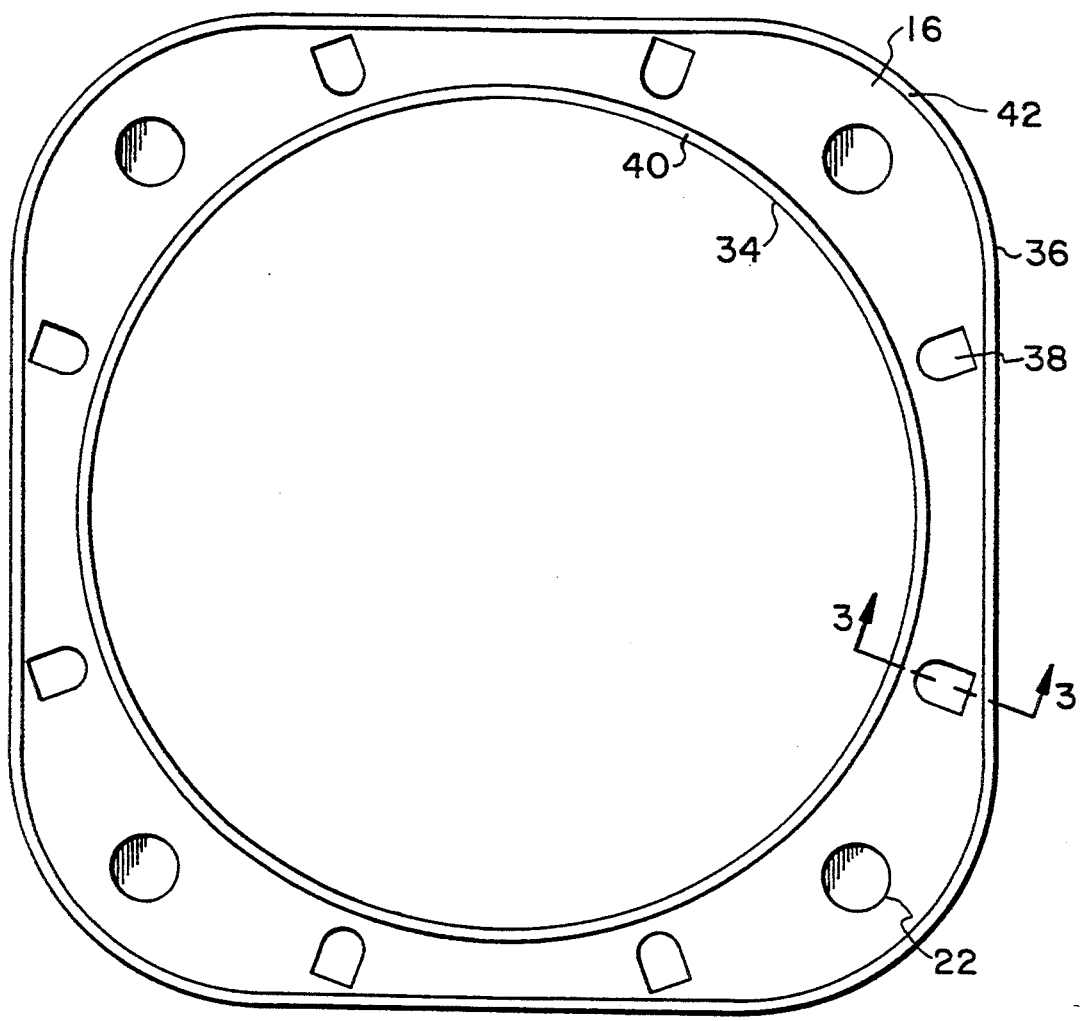
FIG. 2 is a top plan view of the annular retainer illustrating the fastener holes and tabs.

The annular retainer 16, as best seen in FIG. 2, has an inner boundary 34 which defines an opening conforming to that of the inflator 14 and a generally rectangular exterior boundary 36, a plurality of first holes 22 passing through the body of the annular retainer, and a plurality of axially descending members 38 attached to the bottom of the annular retainer 16. Optionally, walls can be attached at the inner boundary 34 and outer boundary 36, with both walls 40 and 42 being disposed substantially perpendicular to the base of the retainer ring 16. The retainer ring 16 can be made out of any structurally suitable material such as plastic or metal, with metals such as aluminum or steel being preferred for strength, and with steel being most preferred for high strength and rigidity. The retainer ring can be manufactured by welding axial descending members 38 and the optional walls 40 and 42 to the base, the annular retainer 16 with axial descending members 38 can be cast from one piece of metal, or preferably by stamping and forming the retainer ring 16 out of a single piece of metal to produce a stronger retainer ring 16 using less metal. The stamped retainer has the further advantage of being a low cost efficient means of manufacture.

Figure 3:
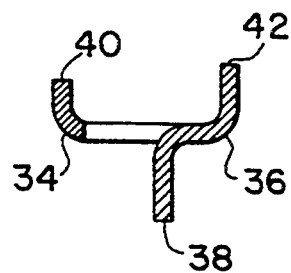
FIG. 3 is a fragmented cross-sectional view of the annular retainer, taken along line 3—3 of FIG. 2, illustrating the tab.

The axial descending member 38, in its preferred embodiment, as best seen in FIG. 3, is a tab 38 with a first pair of parallel sides (hereinafter long sides) and a second pair of parallel sides (hereinafter short sides), with the center of the long sides being perpendicular to axial radii of the annular retainer 16. The tab 38 can be stamped and formed out of the same material as the ring, thus reducing manufacturing and material cost. The tab 38 can then be inserted through member holes in the air bag 12 (hereinafter fifth holes 44) and module housing 18 (hereinafter third holes 46) and then deformed or bent so as to engage the bottom of the module housing 18. Thus the bag is held firmly between the annular retainer 16 and the module housing 18 during assembly of the remainder of the module assembly without the need for further closure means such as a nut 32 or the like and without installation of the inflator.

Figure 4:
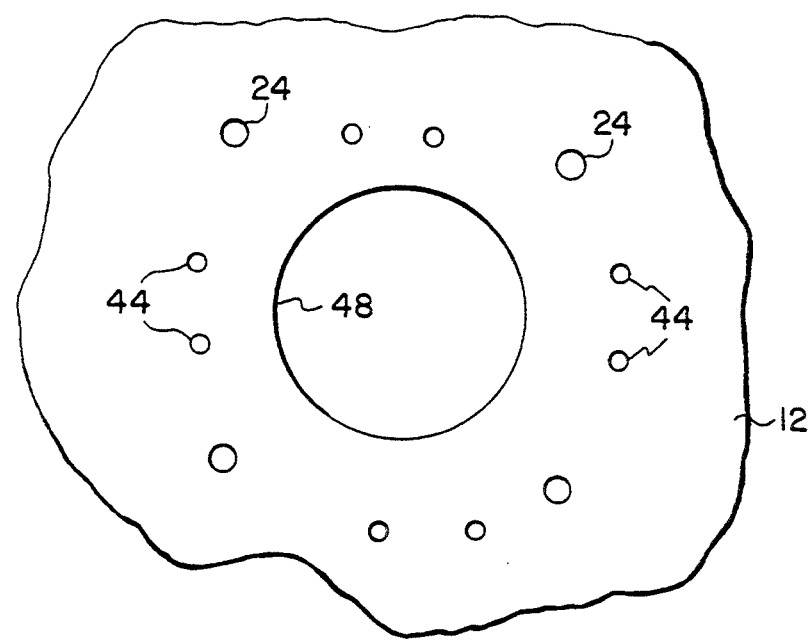
FIG. 4 is a fragmented bottom plan view of the air bag illustrating the central opening and the fastener holes.

As best seen in FIG. 4, the air bag 12 has a gas inlet opening which conforms to the general shape of the inflator 14 in a generally central region thereof defined by gas inlet opening boundary 48. Radially outward of the gas inlet opening boundary 48 are fastener openings 24 or fourth holes and fifth holes 44 to accommodate the axial descending members 38 of the annular retainer 16. The area of the air bag 12 radially outward of the gas inlet opening boundary 48 is clamped between annular retainer 16 and module housing 18 by axial clamping.

Figure 5:
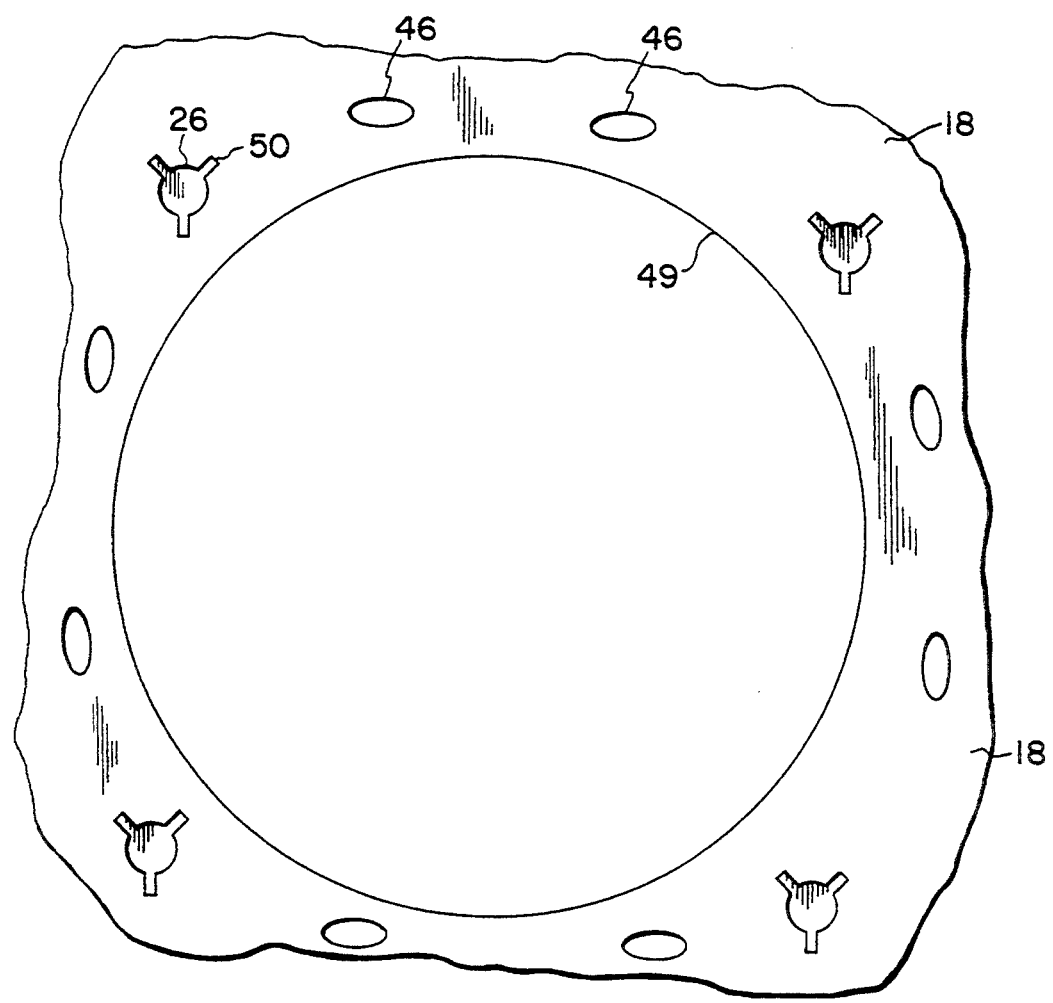
FIG. 5 is a fragmented top plan view of the module housing illustrating the undersized bolt fastener holes.

The module housing 18, as best seen in FIG. 5, has an inner boundary 49 which defines a module opening conforming to that of the inflator 14, a plurality of second holes 26 passing through the module housing 18, a plurality of third holes 46, and a mounting edge (not shown). The third holes 46 are positioned to receive the axial descending members 38 when the annular retainer 16 is brought into proper relation thereto.

In addition to deforming the annular retainer tab 38 the module housing 18 can be held in place during assembly of the air bag module by undersized module housing second holes 26, as shown in FIG. 5, which grip the walls of the fasteners 20. Notches 50 cut radially outward around the circumference of the openings 26 reduce the circumferential strength at the opening thus permitting the edges of the hole 26 to deform and engage the wall of the fastener when the module housing is pressed in place. Thus the bag is held firmly between the annular retainer and the module housing during assembly of the remainder of the module assembly without the need for further closure means such as nuts 32 or the like. Circumferential strength of the edges of the openings 26 can also be reduced by beveling or tapering the metal around the periphery of the opening 26. The module housing 18 can be made out of any suitable metal, such as aluminum or steel, with steel being preferred for strength and rigidity.

The various modifications of the annular retainer 16 with the axial descending members 38 are shown in FIGS. 6 to 9.

Figure 6:
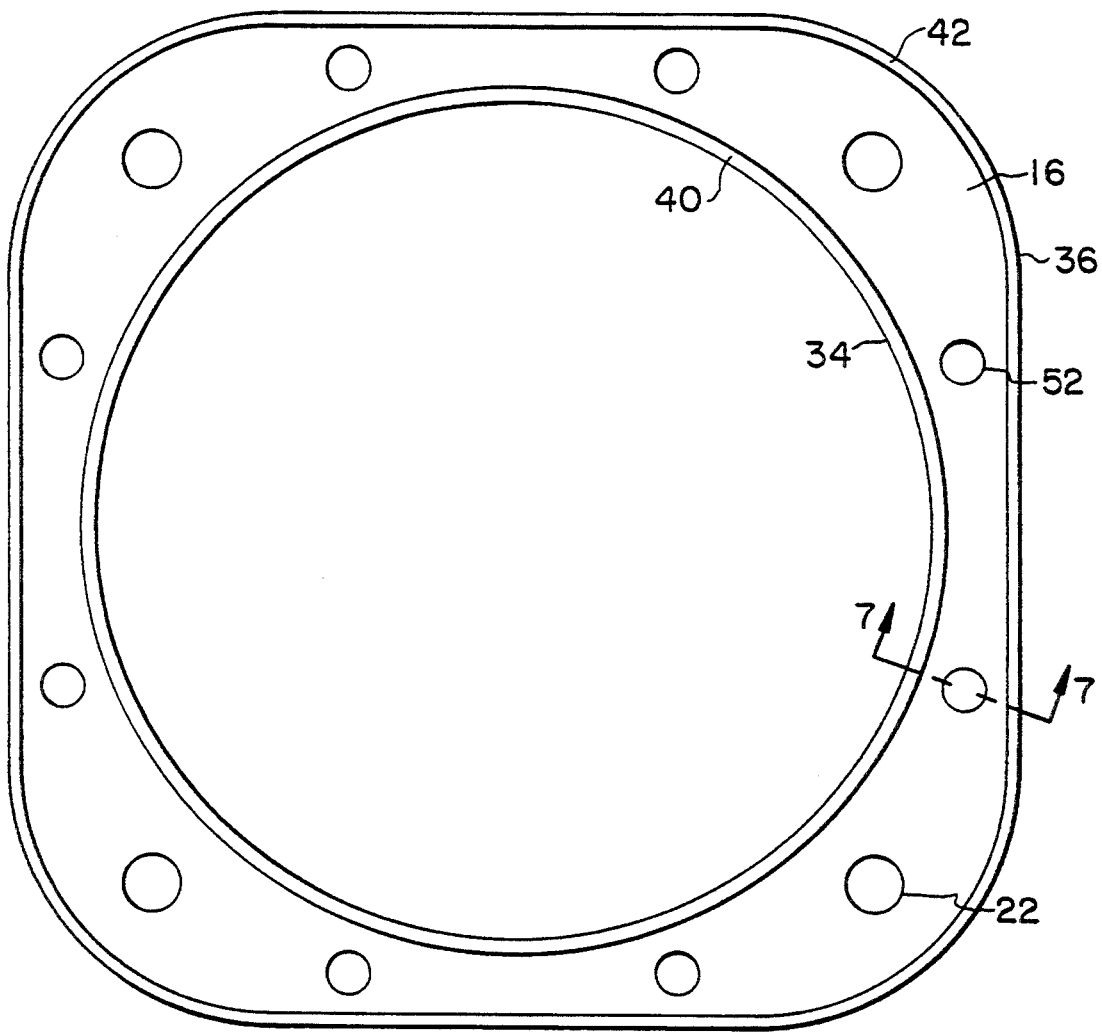
FIG. 6 is a top plan view of a modification of the annular retainer illustrating the fastener holes and dimples.
Figure 7:
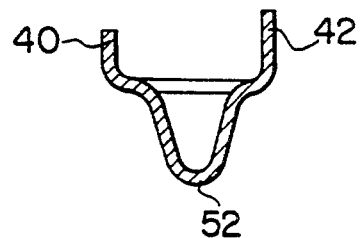
FIG. 7 is a fragmented cross-sectional view of the annular retainer, taken along line 7—7 of FIG. 6, illustrating the dimple.

In the embodiment of the axial descending members shown in FIGS. 6 and 7 the tabs 38 are are replaced by dimples or cones 52 attached to the underside of the annular retainer 16 or formed by stamping the shape out of the annular retainer 16. The attached dimples or cones 52 can be solid or hollow.

Figure 8:
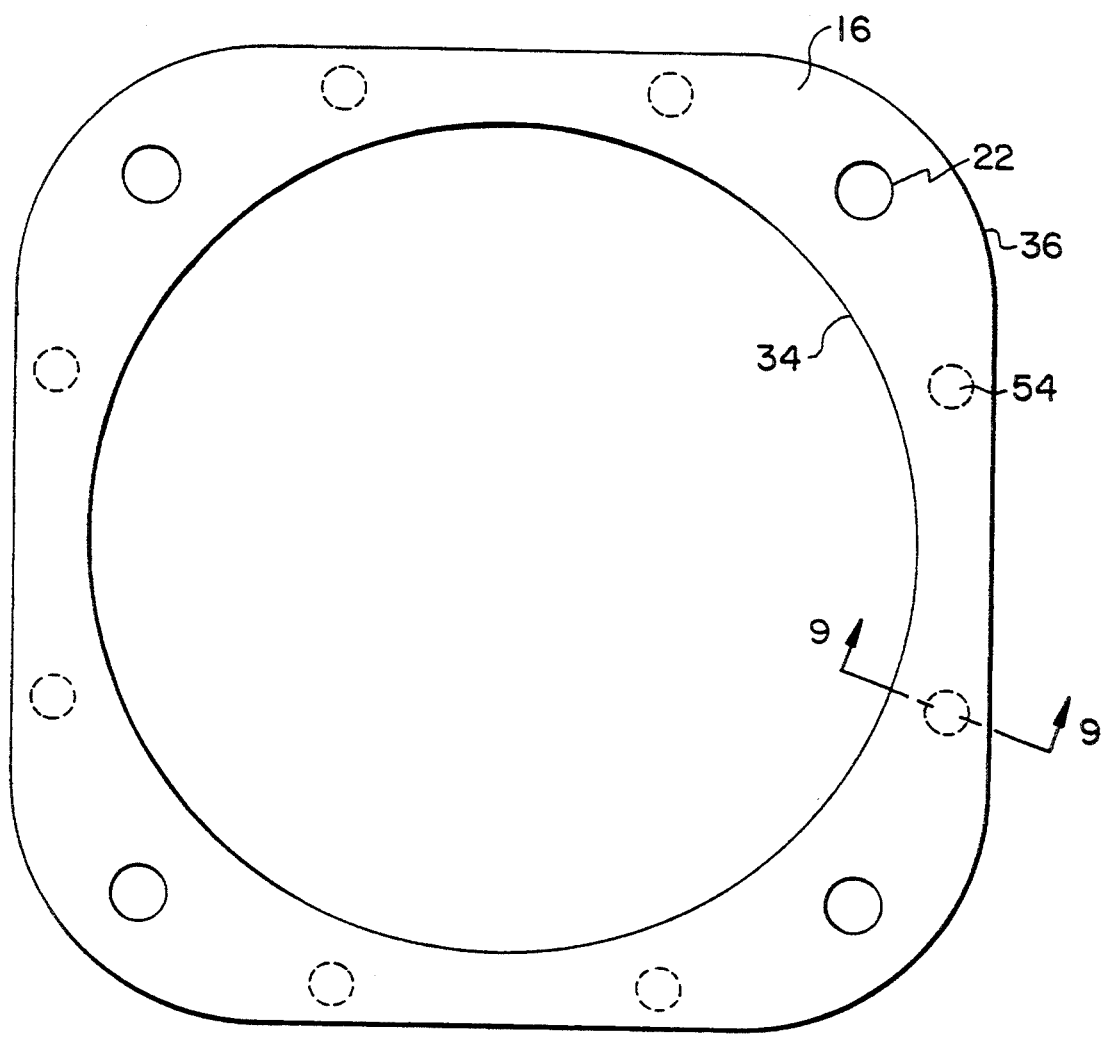
FIG. 8 is a top plan view of a modification of the annular retainer illustrating the fastener holes.
Figure 9:
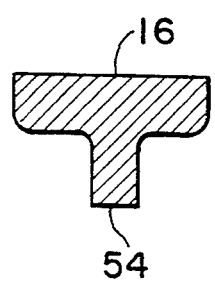
FIG. 9 is a fragmented cross-sectional view of the annular retainer, taken along line 9—9 of FIG. 8, illustrating the circular post.

In the embodiment of the axial descending members shown in FIGS. 8 and 9 the tabs 38 are replaced by circular posts or pins 54 attached to the underside of the annular retainer 16 or formed by stamping the shape out of the annular retainer 16. The attached circular posts or pins 54 can be solid or hollow.

The tip of the dimple or cone 52 and the circular post or pin can be deformed after insertion through the air bag 12 and module housing 18 to hold the air bag in place during assembly of the air bag module without securing the fastener means. To aid in the deformation of the axial descending member in the form of a dimple or pin ribs can be formed on the outside of the axial descending member 38 to engage better with the module housing third hole 46.

Fasteners 20 are inserted from the wall side of the annular retainer 16 through first holes 22. Rivets or bolts can be used with clinch fit bolts pressed into place in the annular retainer 16 being preferred. The annular retainer 16 is then inserted through the gas inlet opening in the air bag 12 with the wall side of the retainer ring 16 facing inwardly of the bag. The fasteners 20 are inserted through the fastener holes 24 that are provided in the air bag, as shown in FIG. 4. The module housing 18 is then placed over the outside of the air bag gas inlet opening boundary 48 clamping a region of the air bag 12 adjacent to the inner edge thereof. To prevent the escape of gas and to reinforce the bag edge, a sealant or caulking can be applied between the interfacing surfaces.

With the air bag 12 clamped between the annular retainer 16 and the module housing 18 by means of the undersized modular retainer second holes 26 and the axial descending member 38 the air bag module is assembled without attachment of the inflator 14. The air bag 12 can be folded and the assembly mounted on the air bag module assembly. After the assembly is complete, except for the inflator 14, the inflator 14 is inserted through a central opening in the module housing 18 and secured by attaching nuts 32 or the like. The arrangement clamps an annular portion of the air bag adjacent to the gas inlet opening boundary 48 between the annular retainer 16 and the module housing 18 attaching the clamping assembly to the flange 30 of the inflator 14. In accordance with the invention, this may comprise the final step in the installation of the air bag module assembly. Although the invention has been described in an application in which the inflatable air bag is mounted to a steering wheel, those skilled in the art will understand that the air bag module assembly can be mounted onto the dashboard or some other part of the body of the vehicle.

In the operation of the air bag restraint system, the impact upon a crash or collision is detected by a sensor (not shown) which ignites gas generant provided in the inflator 14. The inflator 14 discharges inflating gas into the air bag 12 to effect rapid inflation thereof, breaking away a cover (not shown) so that the air bag can expand over the region between the steering wheel and the driver of the vehicle and thus absorb the impact on the latter. At this time the clamped portion of the air bag 12 is subjected to high radial forces which tend to pull the air bag 12 from the mounted position thereof. However, the shear stress of the air bag fabric in the area appurtenant to the fourth holes 24 and the fifth holes 44 act in opposition to those forces and retains the air bag 12 firmly in place, thus preventing gas leakage and assuring the protection of the driver.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope to the invention be determined by the scope of the appended claims.

We claim:

1. An air bag mounting system for assembling an air bag with a module housing consisting essentially of:

an annular retainer having a first inner boundary, a body with a top and bottom, a first outer boundary, a plurality of first holes passing through the body of the annular retainer, and a plurality of integral axial descending tab members formed out of said annular retainer and projecting away from said bottom of said body of said annular retainer, said axial descending tab members being formed by providing U-shaped openings in said annular retainer with tab-bent portions opposite the bites of said U-shaped openings and said tab-bent portions being circumferentially spaced at substantially the same radius along said annular retainer, a module housing having a mounting edge, a module body with a module top and module bottom, and second inner boundary defining an opening matching the shape of the inflator with a plurality of second holes passing through said module body, and a plurality of third holes passing through said module body positioned to receive said axial descending members of said annular retainer when said annular retainer is brought into proper relation thereto; and an air bag having a gas inlet opening conforming in shape to said opening of said annular retainer in a central region thereof, a plurality of fourth holes radially outwardly of said gas inlet opening, and a plurality of fifth holes radially outward of said gas inlet opening, wherein an annular portion of said gas inlet opening of said air bag is placed between said annular retainer and said module housing, and wherein said axial descending members of said annular retainer pass through said fifth holes and said third holes said axial descending members and the shear stress of the air bag in the area appurtenant to said fifth holes act in opposition to the radial forces generated upon deployment of said air bag and retain said air bag in place;

and a fastener means passed through said first, fourth and second holes to Join said annular retainer, said air bag, and said module housing.

2. A device as specified in claim 1 wherein a first wall integral to said first inner boundary is attached on said top of said annular retainer, said wall being substantially perpendicular to said body of said annular retainer.

3. A device as specified in claim 1 wherein a second wall integral to said first outer boundary is attached on said top of said annular retainer, said wall being substantially perpendicular to said body of said annular retainer.

4. A device as specified in claim 1 wherein said second holes in said module housing are undersized whereby said fastener means engage the edges of said second holes to hold said annular retainer and said air bag to said module housing.

5. A device as specified in claim 4 wherein each of said undersized holes in said module housing is provided with a plurality of circumferentially spaced substantially radially outwardly extending notches from said undersized fastener holes.

6. A device specified in claims 4 or 5 wherein the edges of said undersize holes are beveled.

7. A device as specified in claim 1 wherein said third holes are circular, oval or rectangular in shape.

* * * * *